United States Patent
Atsuyo et al.

[11] Patent Number: 6,120,837
[45] Date of Patent: Sep. 19, 2000

[54] PRIMING METHOD FOR UNEVEN SURFACE

[75] Inventors: Fujita Atsuyo, Chigasaki; Serizawa Takeo, Yokohama, both of Japan

[73] Assignee: Fujix, Inc., Kanagawa Pref., Japan

[21] Appl. No.: 09/232,606

[22] Filed: Jan. 18, 1999

[30] Foreign Application Priority Data

Jan. 22, 1998 [JP] Japan ................................. 10-010261

[51] Int. Cl.⁷ ................................ B05D 5/00; B05D 1/02
[52] U.S. Cl. ........................ 427/142; 427/140; 427/256; 427/373; 427/375
[58] Field of Search .................... 427/140, 141, 427/142, 373, 375, 256

[56] References Cited

U.S. PATENT DOCUMENTS

| | | | |
|---|---|---|---|
| 4,005,033 | 1/1977 | Georgeau et al. | 260/2.5 B |
| 5,137,864 | 8/1992 | Yaguchi et al. | 503/226 |

*Primary Examiner*—Diana Dudash
*Assistant Examiner*—Kirsten A. Crockford
*Attorney, Agent, or Firm*—Baker Botts L.L.P.

[57] ABSTRACT

A method for priming an uneven surface of a blank uses a novel "thermally expansible spray putty". This spray putty is prepared by mixing a priming paint for the blank with thermally expansible micro-capsules in amount of 0.5 to 10 weight % of the solid matter of the priming paint. The thermally expansible spray putty is preferably conditioned with an exclusive thinner to a high viscous state enabling it to be air-sprayed. Shell walls of the micro-capsules soften at a temperature below the setting temperature of a thermosetting paint to be used in finish painting of the blank. After the blank being treated by degreasing, drying and the like, the uneven surface of the blank is coated with the thermally expansible spray putty by spraying. After suitably setting the coated spray putty, it is dried by heating so as to expand the micro-capsules to obtain a substantially smooth surface of the blank. After simply grinding the surface, a smooth finish surface is obtained only by intercoating or finish painting it, which is sufficiently endurable to practical use.

9 Claims, 1 Drawing Sheet

PRIMING METHOD FOR UNEVEN SURFACE

BACKGROUND OF THE INVENTION

This invention relates to a method for effectively conditioning uneven or irregular surfaces of industrial products made of a metal, plastic or the like for subsequent baking finish painting or force-drying painting.

In general, a metal blank having uneven surfaces has been painted in consecutive steps of (1) providing a product to be coated or painted, (2) degreasing, (3) treating chemically formed films, and drying, (4) priming coating, drying, and abrading, (5) selective puttying, drying, and abrading, (6) secondary puttying, drying, and abrading, (7) intercoating, drying, and abrading, (8) face or finish painting, and drying. (The drying is the force-drying at a temperature of the order of 80° C. or baking at about 110° C. to 150° C.) In case of plastic products, the step (3) of treating chemically formed films and drying may be usually dispensed with, and the setting of coated films may be typically carried out at lower temperatures (80° C. to 100° C).

If parts of the blank surface wider than 5 mm$^2$ are locally exposed as a result of the abrading step, these parts must be treated over again from the priming coating in the step (4) in order to obtain corrosion-resistance and adhesion. Particularly, magnesium-based blanks which may exhibit the high metallic activity must be treated over again from the treatment of chemically formed films in the step (3), or else it becomes very difficult to obtain the sufficient corrosion-resistance and adhesion.

More particularly, in case of die cast products which have in general pin holes, wrinkles, shrinkage cavities, cracks or the like in their surfaces, the steps (4) to (7) for conditioning the surfaces to be painted require the high cost of labor. Therefore, there has been a strong need for an improved precision die casting to obtain products having smoother surfaces. In the real practice, however, the smoothness of die cast products is of the order of 300 μm at the best. Thus, it has been strongly required to lower the cost by improving the coating or painting processes.

The paints used in the priming coating are called as primer, undercoating paint, primer surfacer or the like and selected from kinds of paints suitable to respective blanks to be coated. Such selected paints are superior in corrosion-resistance and adhesion to blanks and to intercoating paints, and suitably diluted with respective exclusive thinners and applied to the blanks usually by means of spray coating.

If the paints used in the priming coating had a performance making smoother the uneven surfaces of blanks, the most expensive puttying processes could be dispensed with. In more detail, it will be best that the paints applied to blanks for priming coating in a usual manner expand in recesses by heating to provide smooth surfaces for the face or finish painting.

SUMMARY OF THE INVENTION

It is an object of the invention to provide an improved priming method for uneven surfaces to be painted, which overcomes the disadvantages of the prior art and which makes the priming process simplified to reduce painting cost as a whole.

It is another object of the invention to provide an improved priming method for uneven surfaces to be painted, which uses a novel priming paint to obtain smoother surfaces, on which smooth coated surfaces are easily obtained by finishing painting with resulting inexpensive cost.

As a result of various investigations of utilization of thermally expansible micro-capsules by inventors of the present application in order to solve the above problems in the prior art, they have obtained a novel priming compound or paint for achieving the object of the invention by mixing a slight amount of micro-capsules expansible at below a baking temperature of the facing or finishing paint into a priming paint called as primer, undercoating paint or primer surfacer, which sets at room temperature or sets by baking at below the baking temperature of the facing or finishing paint, and conditioning the thus obtained priming compound or paint to increase a nonvolatile matter in excess of the normal value.

In the inventors' investigations, blanks having uneven surfaces which inherently need the puttying process were coated on their uneven surfaces with the new priming compound by spraying to thicknesses more than halves of depths of the recesses in the surfaces without the puttying process and were left as they were to set for a suitable time. Thereafter, when the coated films were heated to expand the micro-capsules, the coated surfaces became smoother as a whole. After simply grinding the surfaces, only by intercoating or finish painting them smooth finish surfaces sufficiently endurable to practical use were obtained.

In order to clarify the mechanism providing the smooth surfaces, sections of them were microscopically observed to find that coated films in the recess before heating were thicker than those on the other surfaces because the priming compound flowed into the recesses owing to the wider surface areas of the recesses than their opening areas and difference in height between the recesses and the other surfaces. Therefore, it is considered that when the micro-capsules expand by heating and drying, much more micro-capsules expand in the recesses than on the other surfaces to serve to make smoother the entire surfaces because the recesses include therein relatively much more priming compound depending upon their depths than on the other surfaces.

The thermally expansible micro-capsules used in the present invention expand about twice the initial size in diameter and form independent cells. It is supposed that the hydrocarbon solvent included in the micro-capsules will be vaporized and diffused into the priming compound after being heated and dried.

By using the novel priming compound "thermally expansible spray putty", the selective puttying in the step (5) and the secondary puttying in the step (6) which are highly expensive can be dispensed with. In patterned coating in finish painting, moreover, even the intercoating in the step (7) can also be dispensed with. In this way, the conditioning of uneven surfaces to be coated by the use of the "thermally expansible spray putty" can accomplish a considerable improvement in coating processes to reduce the painting cost.

For producing the "thermally expansible spray putty" used herein, the most suitable compounds as priming paints and also in good relation to facing or finishing paints are selected from the group of epoxy resin, melamine resin, urethane resin, acrylic resin, and polyester resin paints, and their copolymer resin paints, these being commercially available and generally called as primers, undercoating paints, primer surfacers or the like. These paints belong to one-pack or two-pack types and cold-drying or force-drying types. Usually, these paints have the setting temperatures within the range from the room temperature to 150° C.

The facing or finishing paints to be applied onto the above priming compounds are baked at temperatures within the range of 90° C. to 180° C. Shell walls of the micro-capsules must be softened at a temperature lower than the setting temperature of finishing paints, in order to prevent the coated films of the finishing paints from being affected by vaporization and diffusion of the hydrocarbon solvent contained in the thermally expansible micro-capsules.

In carrying out the present invention, the suitable amount of the thermally expansible micro-capsules to be mixed into the priming paint depends upon the kind and property of the primer or priming paint selected according to the blank to be coated. The amount of the thermally expansible micro-capsules lies within a range from 0.5 to 10 weight % of the solid matter of the priming paint. As the amount of the thermally expansible micro-capsules becomes less, the thermal expansion is smaller, so that a greater amount of priming paint must be coated on the blank to obtain sufficient expansion of micro-capsules, as a result of which the wet coated film becomes thicker, which will disadvantageously take much time for setting. On the other hand, as the amount of the thermally expansible micro-capsules is much, the hydrocarbon solvent contained in the micro-capsules will adversely affect the coated film, resulting in the insufficient hardness of the coated film which will obstruct the grinding operation and multi-layer coating.

This composite paint "thermally expansible spray putty" is conditioned with an exclusive thinner to a high viscous state to an extent enabling it to be air-sprayed and the thus conditioned paint is then coated onto the blank by air-spraying. Preferably, the coating is effected to obtain a thickness of wet coated films, which is slightly thicker than halves of the depths of recesses in the blank. In such a coating, preferably, the amount of the thermally expansible micro-capsules is 2 to 6 weight % of the solid matter of the priming paint with the roughness of the surface being not more than 300 μm, and not less than 8 weight % with not less than 500 μm in roughness.

The thermally expansible micro-capsule used in the present invention is a fine sphere of the order of 15 μm having shell walls of a solvent resistant thermosetting resin and a low-boiling hydrocarbon solvent contained in the shell. One example of such a micro-capsule is "Matsumoto Micro Sphere" commercially available from Matsumoto Fat and Oil Pharmacy Company. This micro-capsule whose shell walls are of a copolymer of vinylidene chloride resin, acrylonitrile resin or the like, has a grain diameter of less than 30 μm, a softening temperature of 80° C. to 145° C. and a volume expansion ratio 20 to 70 as a performance. Preferably, the thermally expansible micro-capsules used in the present invention are smaller in grain diameter than the "Matsumoto Micro Sphere" and have volume expansion ratios not more than 50. Nowadays, only the "Matsumoto Micro-Sphere F-50D" can be used for carrying out the present invention.

The other coating compounds including thermally expansible micro-capsules have been developed as disclosed, for example, in Japanese Patent Application Opened No. H02-18478, "Paints for Metal Plates and Method for Producing Coated metal plates", Japanese Patent Application Opened No. H06-157976, "Expansible Undercoating Material", Japanese Patent Application Opened No. H06-192459, "Near Infrared Ray Setting Foaming Resin Composition", Japanese Patent Application Opened No. H07-113020, "Lightened Resin Composition" and the like. However, the coating compounds disclosed in these specifications are only mixed with certain amounts of thermally expansible micro-capsules so as to expand by heating to form layers having independent multiple holes, for the purpose of utilizing their cushioning properties, weight-saving, thickly coated expanded films, and putty for sheet metals. They are quite different in object and effect from the thermally expansible spray putty of the present invention enabling uneven surfaces to be smoother by utilizing the delicate performance of the thermally expansible micro-capsules.

The invention will be more fully understood by referring to the following detailed specification and claims taken in connection with the appended drawings.

DESCRIPTION OF THE PREFERRED EMBODIMENTS

Figure 1:
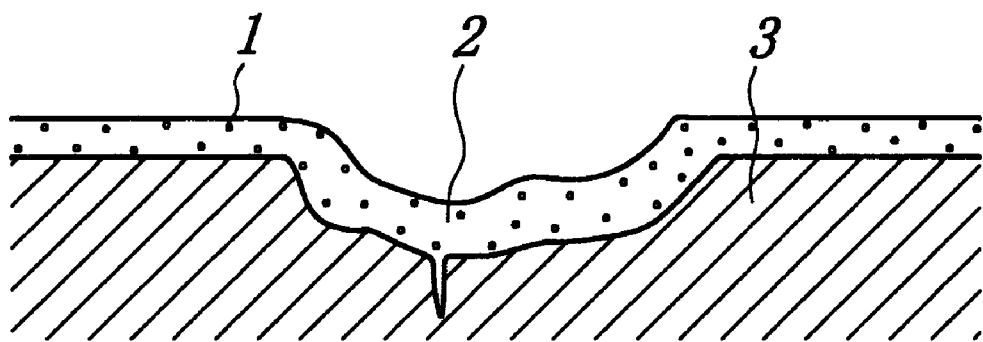
FIG. 1 is a fragmentary cross-sectional view pictorially showing a blank having recesses and cracks on which the thermally expansible spray putty has been coated to a thickness more than half of the depth of the recess according to the invention.

The invention will be explained in more detail by referring to the preferred embodiments hereinafter but is not limited to these embodiments.

EXAMPLE 1

Cold-drying or thermosetting priming paints described later were mixed with various amounts of thermally expansible micro-capsules to obtain "thermally expansible spray putties" having different amounts of the micro-capsules. These spray putties were coated to steel plates having recesses of various depths by air-spraying to form wet coated films of thicknesses in excess of halves of the recess depths. After suitable setting, the wet coated films were subsequently heated to expand the micro-capsules and at the same time to dry the wet coated films. The inventors observed by eyes and estimated the smoothness around the recesses or smoothness after simple grinding and summarized the obtained results in Tables 1 to 4.

From the results, preferably, the amounts of the micro-capsules are 2 to 6 weight % with the recess depths not more than 300μm, and not less than 8 weight % with the recess depths not less than 500 μm. There is no difference in result between the cold-drying and thermosetting paints. With the priming paints such as the primer surfacer having a less resin amount, the micro-capsules will sufficiently expand so that lesser amount of the thermally expansible micro-capsules is preferable.

There is no difference in result within the range from 120° C. to 140° C. at which the thermally expansible micro-capsules used in the present invention are heated.

In order to estimate the smoothness, "the substantial smoothness" observed by eyes is indicated by ○, "the smoothness obtained by simple grinding" by Δ, and "deficient smoothness" by X.

1. Kinds of paints
   (1) Cold-drying type two-pack acrylic urethane resin undercoating paint, "VTOP" produced by Dainippon Paint Co.
       Setting condition: cold-drying or force-drying, non-volatile content: 60%

(2) Cold-drying type epoxy resin primer, "10 SP BLACK" produced by Osaka Vanish Co.
   Setting condition: cold-drying or force-drying, non-volatile content: 36%
(3) Baking type acrylic resin undercoating paint, "UNI PEARL N BLACK" produced by Ohashi Chemical Co.
   Setting condition: at 130° C. for twenty minutes, non-volatile content: 73%
(4) Baking type melamine resin primer surfacer, produced by Fuji Chemical Paint Co.
   Setting condition: at 130° C. for twenty minutes, non-volatile content: 73%

2. Kinds of thermally expansible micro-capsules

Matsumoto Micro-Sphere, "F-50D" produced by Matsumoto Fat and Oil Pharmacy Co.

Grain diameter: 10 to 20 μm, shell wall softening temperature: 100° C., to 105° C., expansion ratio: about 20

The following Tables 1 to 4 show the relation between the smoothness and the recess depths and micro-capsule amounts. Table 1 indicates the results with (1) the cold-drying type two-pack acrylic urethane resin undercoating paint, the heating temperature being 120° C. for twenty minutes.

TABLE 1

| Recess Depth | Amount of Capsule % | | | | | | |
|---|---|---|---|---|---|---|---|
| | 0.5 | 1 | 2 | 4 | 6 | 8 | 10 |
| 50 μm | x | ○ | ○ | ○ | Δ | Δ | Δ |
| 100 μm | x | x | ○ | ○ | ○ | Δ | Δ |
| 200 μm | x | x | x | ○ | ○ | Δ | Δ |
| 300 μm | x | x | x | ○ | ○ | Δ | Δ |
| 500 μm | x | x | x | x | x | x | Δ |

Table 2 indicates the results with (2) cold-drying type epoxy resin primer, the heating temperature being 140° C for twenty minutes.

TABLE 2

| Recess Depth | Amount of Capsule % | | | | | | |
|---|---|---|---|---|---|---|---|
| | 0.5 | 1 | 2 | 4 | 6 | 8 | 10 |
| 50 μm | ○ | ○ | ○ | Δ | Δ | Δ | Δ |
| 100 μm | x | x | ○ | ○ | Δ | Δ | Δ |
| 200 μm | x | x | ○ | ○ | Δ | Δ | Δ |
| 300 μm | x | x | x | ○ | Δ | Δ | Δ |
| 500 μm | x | x | x | x | ○ | Δ | Δ |

Table 3 indicates the results with (3) baking type acrylic resin undercoating paint, the heating temperature being 130° C for twenty minutes.

TABLE 3

| Recess Depth | Amount of Capsule % | | | | | | |
|---|---|---|---|---|---|---|---|
| | 0.5 | 1 | 2 | 4 | 6 | 8 | 10 |
| 50 μm | ○ | ○ | ○ | Δ | Δ | Δ | Δ |
| 100 μm | x | ○ | ○ | Δ | Δ | Δ | Δ |
| 200 μm | x | x | ○ | ○ | Δ | Δ | Δ |
| 300 μm | x | x | ○ | ○ | Δ | Δ | Δ |
| 500 μm | x | x | x | x | Δ | Δ | Δ |

Table 4 indicates the results with (4) baking type melamine resin primer surfacer, the heating temperature being 130° C. for twenty minutes.

TABLE 4

| Recess Depth | Amount of Capsule % | | | | | | |
|---|---|---|---|---|---|---|---|
| | 0.5 | 1 | 2 | 4 | 6 | 8 | 10 |
| 50 μm | ○ | Δ | Δ | Δ | Δ | Δ | bad |
| 100 μm | ○ | ○ | Δ | Δ | Δ | Δ | bad |
| 200 μm | ○ | ○ | ○ | Δ | Δ | Δ | bad |
| 300 μm | x | ○ | ○ | Δ | Δ | Δ | bad |
| 500 μm | x | x | ○ | Δ | Δ | Δ | bad |

EXAMPLE 2

Typical priming paints were mixed with various amounts of thermally expansible micro-capsules to obtain "thermally expansible spray putties" having different amounts of the micro-capsules. These spray putties were coated on steel plates having smooth surfaces to various thicknesses of wet coated films. After suitable setting, the wet coated films were subsequently dried by heating to expand the micro-capsules. Thereafter, the thicknesses of the coated films were measured. The thicknesses of the coated films before and after being dried by heating are shown in Table 5.

In order to indicate the expansions of the spray putties, Table 5 shows the relation between the micro-capsule amounts and thicknesses of the coated films before and after being dried with the baking type acrylic resin undercoating paint, the heating temperature being 130° C. for twenty minutes.

The expansions of the coated films are somewhat different depending upon the kinds of the paints, but the expansions of paints called as primers or undercoating paints are generally at the same level as those of typical paints. As the wet films are thicker, the expansions become better.

TABLE 5

| Condition | | Amount of Capsule % | | | | | |
|---|---|---|---|---|---|---|---|
| | | 0 | 1 | 2 | 4 | 6 | 8 |
| 1 | Before Baking μm | 40 | 40 | 40 | 40 | 40 | 40 |
| | After Baking μm | 35 | 46 | 56 | 60 | 65 | 72 |
| 2 | Before Baking μm | 80 | 80 | 80 | 80 | 80 | 80 |
| | After Baking μm | 67 | 95 | 115 | 125 | 135 | 145 |
| 3 | Before Baking μm | 120 | 120 | 120 | 120 | 120 | 120 |
| | After Baking μm | 100 | 140 | 175 | 190 | 200 | 220 |
| 4 | Before Baking μm | 160 | 160 | 160 | 160 | 160 | 160 |
| | After Baking μm | 135 | 190 | 230 | 250 | 265 | 310 |

Figure 2:
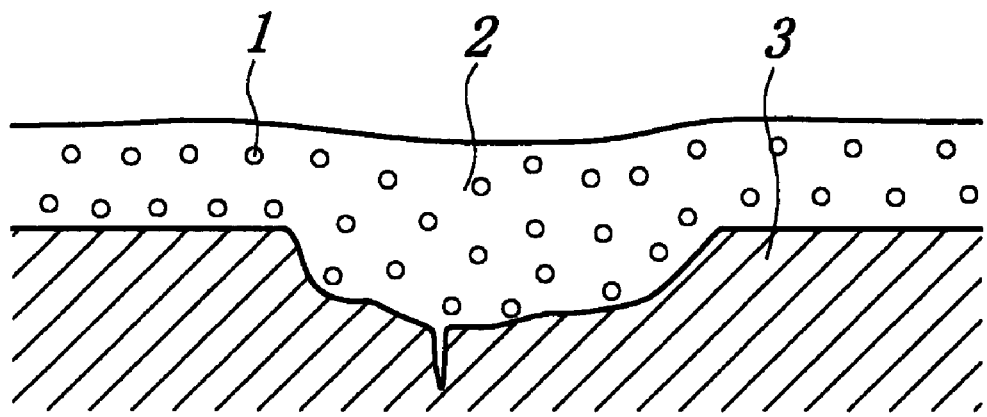
FIG. 2 is a fragmentary cross-sectional view pictorially showing the blank shown in FIG. 1 which has been dried by heating at 130° C. for twenty minutes, as a result of which the micro-capsules have been expanded to obtain a smooth surface.

FIGS. 1 and 2 pictorially illustrate in fragmentary cross-section the change in coated surface of a blank having recesses and cracks after and before expanding by heating. The thermally expansible spray putty has been coated to a thickness more than half of the depth of the recess according to the invention on (FIG. 1) and the coated surface has been dried by heating at 130° C. for twenty minutes, as a result of which the micro-capsules have been expanded to obtain a smooth surface (FIG. 2).

The present invention concerns with a method for effectively conditioning uneven surfaces of industrial products made of a metal, plastic or the like for subsequent baking finish or force-drying painting.

In painting processes for metal blanks having uneven surfaces, the selective puttying or puttying all over surfaces is unavoidably performed. However, by using the "thermally expansible spray putty" according to the invention, these puttying processes can be dispensed with.

This "thermally expansible spray putty" according to the invention is obtained by mixing thermally expansible micro-capsules expansible at below a baking temperature of a facing or finishing paint into a priming paint called as a primer, undercoating paint, or primer surfacer which will set at room temperature or set by baking at below the baking temperature of the facing or finishing paint, in amount of 0.5 to 10 weight % of the solid matter of the priming paint. Preferably, the priming paint suitable to a blank to be painted is selected, and the amount of the thermally expansible micro-capsules to be mixed into the priming paint is determined depending upon the extent of the unevenness of the blank surface.

The blank having uneven surface which inherently needs the puttying operations is coated on the uneven surface with the thermally expansible spray putty according to the invention by spraying to thicknesses in excess of halves of the depths of recesses. After suitably setting the coated putty, it is dried by heating so as to expand the micro-capsules to obtain a substantially smooth surface of the blank. After simply grinding the surface, a smooth finish surface is obtained only by intercoating or finish painting it, which is sufficiently endurable to practical use.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A method for priming an uneven surface of a blank to be painted, said method comprising, coating said surface by spraying with a thermally expansible spray putty obtained by mixing a priming paint for the blank, with thermally expansible micro-capsules in amount of 0.5 to 10 weight % of the solid matter of said priming paint, shell walls of said micro-capsules softening at below a setting temperature of a thermosetting paint for finish painting of said blank; setting said priming paint; and heating said priming paint to expand said micro-capsules, whereby effectively making said uneven surface of the blank to be smooth.

2. The method as set forth in claim 1, wherein said thermally expansible spray putty includes a priming paint selected from a group of primers, undercoating paints and primer surfacers and thermally expansible micro-capsules in amount of 0.5 to 10 weight % of the solid matter of said priming paint.

3. The method as set forth in claim 1 or 2, wherein the step of heating said priming paint to expand said micro-capsules is effected at a temperature of 80° C. to 150° C.

4. The method as set forth in claim 1 or 2, wherein the amount of thermally expansible micro-capsules in the priming paint is varied depending upon roughness of the surfaces of blanks to be coated.

5. The method as set forth in claim 3, wherein the amount of thermally expansible micro-capsules in the priming paint is varied depending upon roughness of the surfaces of blanks to be coated.

6. The method of claim 1 or 2 wherein the surface of the blank has a roughness of no more than 300 µm and the thermally expansible micro-capsules comprise between 2 to 6 weight % of the solid matter of the priming paint.

7. The method of claim 1 or 2 wherein the surface of the blank has a roughness of no less than 500 µm and the thermally expansible micro-capsules comprise not less than 8 weight % of the solid matter of the priming paint.

8. The method of claim 3 wherein the surface of the blank has a roughness of no more than 300 µm and the thermally expansible micro-capsules comprise between 2 to 6 weight % of the solid matter of the priming paint.

9. The method of claim 3 wherein the surface of the blank has a roughness of no less than 500 µm and the thermally expansible micro-capsules comprise not less than 8 weight % of the solid matter of the priming paint.

* * * * *

UNITED STATES PATENT AND TRADEMARK OFFICE
CERTIFICATE OF CORRECTION

PATENT NO.   : 6,120,837
DATED        : September 19, 2000
INVENTOR(S)  : Fujita et al.

It is certified that error appears in the above-identified patent and that said Letters Patent is hereby corrected as shown below:

Column 2,
Line 60, "as" should be deleted

Column 3,
Line 19, "is much" should read -- becomes greater --

Column 4,
Line 50, "less" should read -- lesser --

Column 6,
Table 4, "Amout" should read -- Amount --
Line 32, "as" should be deleted Column 7,
Line 4, "as" should be deleted Signed and Sealed this Twenty-sixth Day of March, 2002

Attest:

JAMES E. ROGAN
*Attesting Officer*   *Director of the United States Patent and Trademark Office*